United States Patent
Zampetti (10) Patent No.: US 8,064,484 B2
(45) Date of Patent: Nov. 22, 2011

(54) ENHANCED CLOCK CONTROL IN PACKET NETWORKS

(75) Inventor: George P. Zampetti, Livermore, CA (US)

(73) Assignee: Symmetricom, Inc., San Jose, CA (US)

( * ) Notice: Subject to any disclaimer, the term of this patent is extended or adjusted under 35 U.S.C. 154(b) by 162 days.

(21) Appl. No.: 11/669,882

(22) Filed: Jan. 31, 2007

(65) Prior Publication Data

US 2008/0049743 A1   Feb. 28, 2008

Related U.S. Application Data (60) Provisional application No. 60/763,967, filed on Feb. 1, 2006.

(51) Int. Cl.
*H04J 3/06* (2006.01)

(52) U.S. Cl. ........... 370/503; 375/354; 713/400

(58) Field of Classification Search ............ None
See application file for complete search history.

(56) References Cited

U.S. PATENT DOCUMENTS

| | | | |
|---|---|---|---|
| 5,812,749 A * | 9/1998 | Fernandez et al. | 714/4 |
| 6,438,702 B1 * | 8/2002 | Hodge | 713/400 |
| 6,650,719 B1 * | 11/2003 | Baker | 375/371 |
| 7,130,368 B1 * | 10/2006 | Aweya et al. | 375/376 |
| 7,415,044 B2 * | 8/2008 | Kallstenius | 370/516 |
| 2002/0136335 A1 * | 9/2002 | Liou et al. | 375/354 |
| 2003/0048811 A1 * | 3/2003 | Robie et al. | 370/509 |
| 2004/0093435 A1 * | 5/2004 | Purho | 709/400 |
| 2004/0125822 A1 * | 7/2004 | Jun et al. | 370/503 |
| 2006/0095553 A1 * | 5/2006 | Ogawa et al. | 709/223 |
| 2006/0156011 A1 * | 7/2006 | Masui | 713/178 |
| 2007/0061628 A1 * | 3/2007 | Bradbury et al. | 714/39 |

* cited by examiner

*Primary Examiner* — Chi Pham
*Assistant Examiner* — Mohammad Adhami
(74) *Attorney, Agent, or Firm* — Patterson & Sheridan, LLP (57) ABSTRACT

One embodiment of the present invention sets forth a method for autonomously validating the time and frequency data obtained from multiple sources, and generating a suitable estimate of the frequency difference between the client clock and the source. The method includes the steps of protocol data unit validation, offset measurement, minimum offset filtering, and frequency filtering. With these steps, the negative effects of packet delay variation may be mitigated and a frequency estimate is determined for the source in question, together with an associated validity status. Consequently, quality control of the local clock is achieved in packet networks at significantly reduced cost and decreased level of complexity relative to prior art approaches.

17 Claims, 6 Drawing Sheets

ENHANCED CLOCK CONTROL IN PACKET NETWORKS

CROSS-REFERENCE TO RELATED APPLICATIONS

This application claims benefits of the U.S. provisional application Ser. No. 60/763,967, filed Feb. 1, 2006, which is herein incorporated by reference. This application is also related to U.S. Pat. No. 5,751,777 and U.S. Pat. No. 5,943,381, which are herein incorporated by reference.

BACKGROUND OF THE INVENTION

1. Field of the Invention

Embodiments of the present invention generally relate to methods of controlling the clock of a network element deployed within a communications network and, more specifically, to enhanced clock control in packet networks.

2. Description of the Related Art

In many telecommunications applications, each element in the network has its own clock (referred to herein as a "client clock") running independently of the other clocks in the network. Quartz oscillators typically serve as client clocks in network elements, providing frequency to support local timescale generation. While quartz oscillators offer good frequency stability over short term measurement intervals, their intermediate and long term frequency stability does not meet the telecommunications standards. Therefore, client clocks must be checked and corrected against external traceable sources. Furthermore, given the immense number of elements in the network, the clock of each element is required to not only provide good frequency stability over all measurement intervals, but also be reproducible throughout the entire network with the lowest cost per element.

Figure 1:
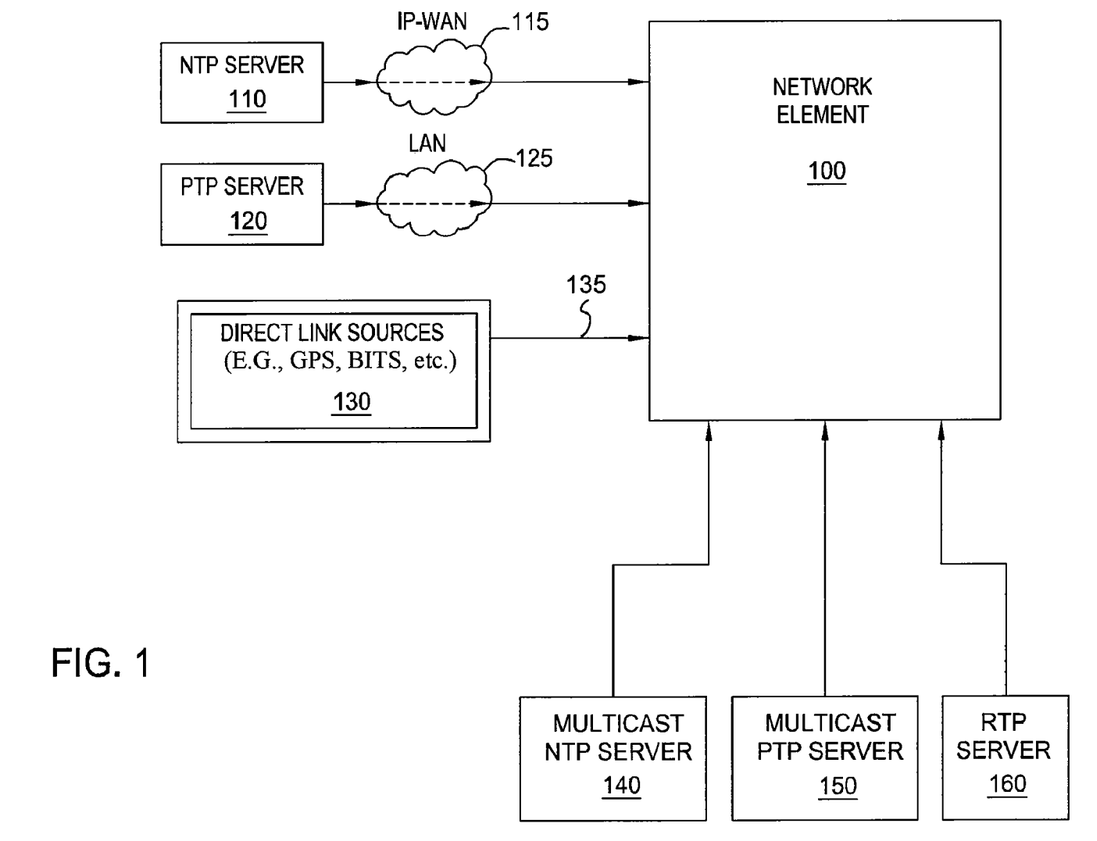
FIG. 1 illustrates a variety of timing sources that may be available to a network element.

There are several means of providing timing information to client clocks at the client network elements. In legacy telecommunications networks, network elements utilized time-division multiplexing (TDM) links, such as T1 and SONET, which are inherently capable of carrying reliable frequency information from a server to a client at the physical layer. However, next generation networks may be based on a packet-switched infrastructure (such networks are referred herein as "packet networks") and there may be situations where the physical medium interconnecting network elements is no longer capable of transporting frequency information at the physical layer. Therefore, packet-based methods for transporting timing information are required. FIG. 1 illustrates a variety of timing sources that may be available to a network element 100. Timing sources include a Network Time Protocol (NTP) server 110, a Precision Timing Protocol (PTP) server 120, direct link sources 130, a multicast NTP server 140, a multicast PTP server 150, and a Real-Time Protocol (RTP) server 160. The NTP server 110 and the PTP server 120 enable packet-based methods for transporting timing information through an IP-WAN 115 and LAN 125, respectively. Unless specifically stated otherwise, the terms "NTP server" and "PTP server" as used herein mean that the servers operate in a unicast mode, where there is a secure one to one association between a server and a client ensuring a level of traceability. The direct link sources 130 are sources such as Global Positioning Satellite (GPS), Building Integrated Timing Supply (BITS), SONET, SDH, and PDH, which provide timing information to a network element through a direct link 135. The multicast NTP server 140 and multicast PTP server 150 are multicast servers, capable of providing packet-based timing information with an N to M association between a server and a client, where N and M may be any integer greater or equal to one and $N \ll M$.

Even though a variety of timing sources may be available to the network element 100, not all timing sources are available in all cases. Also, their frequency stability is not always satisfactory for the telecommunications standard. The Multiple inputs Frequency Locked Loop (MiFLL) disclosed in U.S. Pat. No. 5,751,777 and U.S. Pat. No. 5,943,381, incorporated by reference above, achieves client clocks with good stability for any specified time measurement interval by optimally combining primary and secondary tier inputs. "Primary tier inputs" refer to timing information that comes over a verifiable (traceable) path from a known reliable timing source, such as the NTP server 110, the PTP server 120, or direct link sources 130. "Secondary tier inputs" originate from a better or equal stratum source than the local oscillator, but are not explicitly verifiable. The multicast NTP server 140 and multicast PTP server 150 could be used as secondary tier inputs, which would allow extracting time and frequency information with lower cost, lower power local oscillators without adding the burden of additional client transactions to the primary tier sources.

However, extracting time and frequency information from the multicast NTP and PTP flows creates several problems. First, it is not always known if these flows are sourced from a reliable server clock. Second, in practice, each packet in a flow experiences different delay with a significant random component, a phenomenon referred to as "packet delay variation" (PDV). As a result, inaccurate data may be sent to the MiFLL, compromising the performance of a client clock.

As the foregoing illustrates, what is needed in the art is a technique and apparatus for autonomously validating the time and frequency data obtained from multiple sources and generating a suitable estimates of the frequency differences between the client clock and the sources by mitigating the effects of PDV, so that only reliable data is sent to the MiFLL.

SUMMARY OF THE INVENTION

One embodiment of the present invention sets forth a method for autonomously validating the time and frequency information received from a server clock and generating a frequency estimate between a client clock and the server clock. The method includes the steps of receiving at least two protocol data units (PDUs), where each PDU includes a plurality of time stamps, extracting the plurality of time stamps from each PDU, and performing an offset measurement for each PDU to compute a time offset between the client clock and the server clock for each PDU, where each offset measurement is based on at least two of the time stamps associated with the PDU for which the offset measurement is being performed. The method also includes the steps of performing minimum offset filtering (MOF) on the time offsets to remove any time offsets that are based on invalid time stamp data and performing frequency estimate filtering (FEF) on the filtered time offsets to produce the frequency estimate and providing the frequency estimate to the MiFLL to achieve a good stability in the client clock for any specified time measurement interval.

One advantage of the disclosed methods is that control of the client clock may be achieved by using less trustworthy timing sources such as multicast NTP and multicast PTP servers to supplement the primary tier sources. The disclosed methods include the algorithms for cross-checking the measurement data obtained from the multicast NTP and multicast PTP servers, autonomously establishing validity of the channel, and concluding whether the current frequency estimate from a channel may be used in the MiFLL algorithm. As a result, time and frequency information at the client clocks can be extracted with lower cost, lower power oscillators without adding the burden to the primary tier sources, thereby reducing costs for both the servers and the clients.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

The present invention improves upon the teachings of U.S. Pat. No. 5,751,777 and U.S. Pat. No. 5,943,381, the entire contents of both of which are incorporated herein by reference for all purposes.

Figure 2:
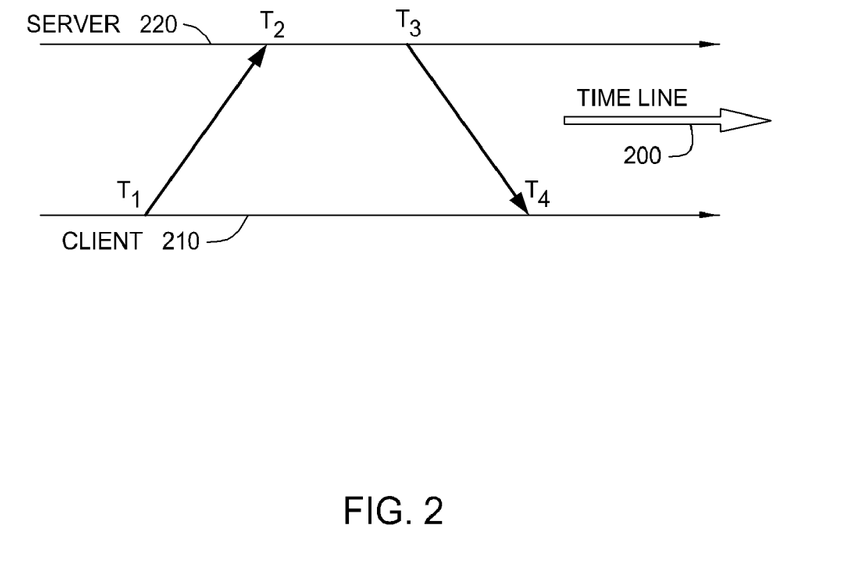
FIG. 2 illustrates the notions of time stamps, according to one embodiment of the present invention.

FIG. 2 illustrates the notions of time stamps, according to one embodiment of the present invention. Both the primary tier and the secondary tier sources utilize variants of a time stamping process illustrated in FIG. 2. As shown, a time measurement process may involve four time stamps along a timeline 200, which are defined as follows:

$T_1$ is a time stamp representing the best estimate of the transmit origination epoch of a protocol data unit (PDU) originating from the clock of a client 210, $T_2$ is a time stamp representing the best estimate of the receive termination epoch of a PDU terminating at the clock of a server 220, $T_3$ is a time stamp representing the best estimate of the transmit origination epoch of a PDU originating from the clock of the server 220, and $T_4$ is a time stamp representing the best estimate of the receive termination epoch of a PDU terminating at the clock of the client 210.

Each time stamp represents a critical epoch in a protocol transaction. Precise time stamps are typically conveyed in a single packet or, more generally, a single PDU, with the exception of PTP which supports the notion of a follow-up packet with a precise time stamp. Once the PDU is received at the client clock, the time stamps are used to generate an estimate of the frequency difference between the client clock and the originating source clock at the server, referred to herein as a "frequency estimate". Furthermore, in the following description, the term "channel" is used to reference a particular server clock and an associated path and the term "outlier" is used to reference a timing source that is determined to be invalid.

Figure 3A:
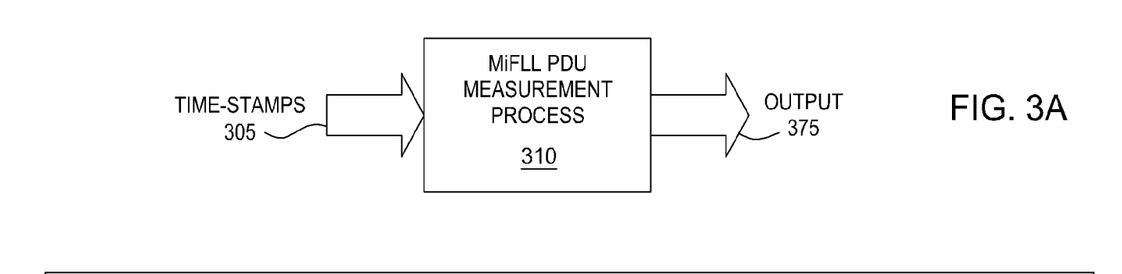
FIG. 3A illustrates frequency estimate generation process, according to one embodiment of the present invention.

FIG. 3A illustrates frequency estimate generation process, according to one embodiment of the present invention. Time stamps 305 are supplied to a MiFLL PDU measurement process 310 which filters the error component due to PDV, as described in more details in FIG. 3B, and produces an output 375. As also described in more details in the subsequent figures, the output 375 may be a frequency estimate with an associated validity flag for a channel associated with the server 220 or a frequency estimate with an associated validity flag and removed frequency outliers. Persons skilled in the art will recognize that since the time stamps on a given transaction depend on the type of transaction (one-way or two-way transactions), not all four time stamps $T_1$-$T_4$ are always present in a PDU. For example, for secondary tier inputs, such as multicast NTP, multicast PTP, and RTP, the transaction is a result of a one-way flow and, therefore, only $T_1$ and $T_2$ are present in a PDU. On the other hand, for the primary tier inputs, such as unicast NTP and PTP the group of time stamps may consist of all four time stamps. Specifically, for unicast NTP all four time stamps are present in every transaction, but for unicast PTP all four time stamps are present only once every N transactions and the rest of the time there are only time stamps $T_1$ and $T_2$.

Figure 3B:
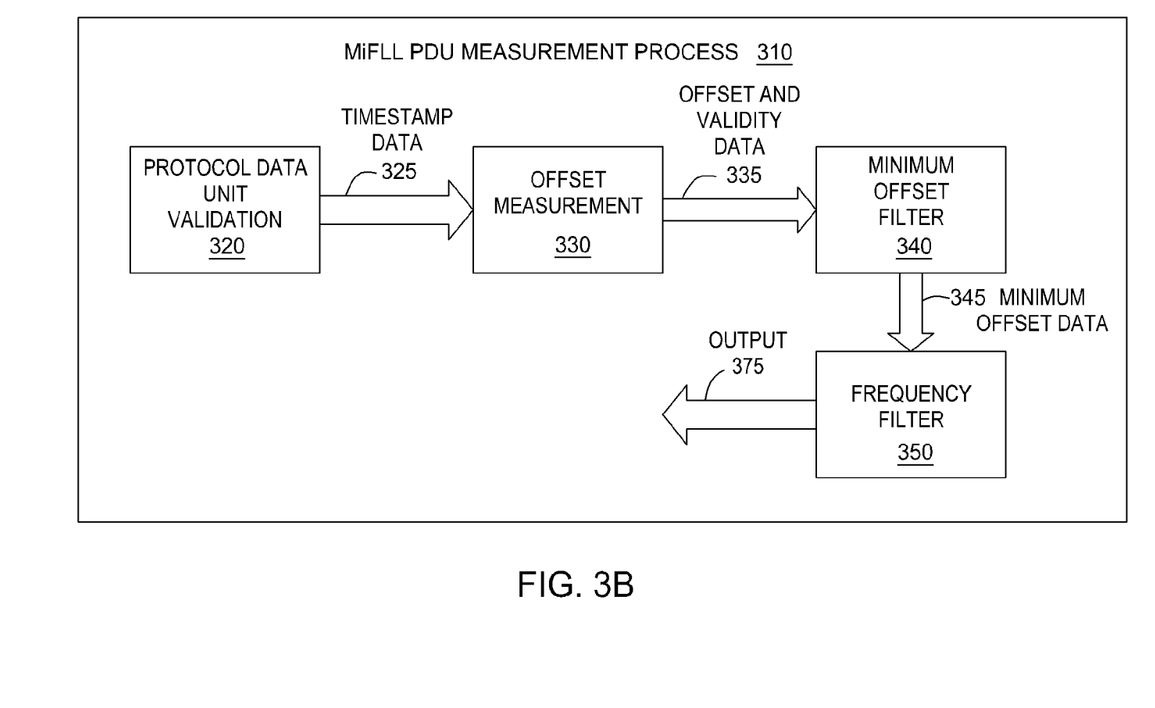
FIG. 3B illustrates the steps of the MiFLL PDU measurement process, according to one embodiment of the present invention.

FIG. 3B illustrates the steps of the MiFLL PDU measurement process 310, according to one embodiment of the present invention. The process begins in step 320 where a PDU validation is performed. This is a standard step assessing if the packet is formed correctly, if the packet is free of errors, and if the packet has the expected addresses. Optionally, step 320 may check if the packet passes authentication.

Once the PDU is validated, the time stamp data 325 is provided to step 330, where an offset measurement is performed. Offset measurements for multicast one way measurements typically does not support any correction for propagation delay while two-way measurement include compensation with time accuracy limited by delay asymmetry in path. The offset measurement for one-way transfer operations, such as, for example, a packet or PDU flow originating at the clock of the server 220 and terminating at the clock of the client 210 is straight forward. In this case, the originating time stamp $T_3$ is recorded with respect to the server view of time (server time scale) while the terminating time stamp $T_4$ is recorded with respect to the client view of time (client time scale) and the measurement offset $\delta_m$ for a transaction n can be calculated as follows:

$$\delta_m(n) = T_4(n) - T_3(n)$$

There are several important properties of the offset measurement. First property is that the offset measurement is biased by the one-way packet delay. The packet delay cannot be estimated with a one-way measurement. Second, the packet delay bias can be minimized by weighting measurements over a relatively short temporal frame with lower values. The packet flow models for a non-congested network support the notion that a minimum delay floor (discussed in more details in step 340) of a network can be effectively established. Finally, the residual bias can either be reduced by estimating the one-way delay through some other means, such as using time stamps associated with the reverse direction, or ignored in the case of frequency estimation as frequency offset is simply the rate of change of the phase offset, which is zero for a constant phase bias error.

From step 330, offset and validity data 335 is provided to step 340, where the minimum offset filter (MOF) pre-processes the offset data to extract data concentrated near the delay floor. This step significantly improves the resulting client clock performance. One property of packet networks is that packet delay variation has a distribution function with a "floor". The floor is defined herein as the minimum delay that a packet or a PDU can experience in a given path. The floor can be viewed as a condition where both output and system queues (in all equipment that is involved in the flow, including the source, destination, and intervening elements) are near their minimum when a particular packet needs the resource. Under non-congested loading conditions a fraction of the total number of packets will traverse the network at or near this floor, even though others may experience significantly longer delays. In principle, floor-based transfer noise will have the minimum limited to the following four factors. First factor is the physical layer propagation "speed of light" delay. Second—is the time stamp resolution. Third—mapping delays over TDM-based transport. Finally, fourth limiting factor is other small delay variation mechanisms such as physical layer clock jitter and backplane clock domain jitter.

The MOF algorithm of step 340 utilizes data associated with each channel at time epoch n and channel measurement property data. The following data is associated with each channel at time epoch n:

$\delta_{mi}[n]$: the measurement offset estimate with respect to the local oscillator of the $i^{th}$ channel at time index n;

$\delta_{utmi}[n]$: the un-tilted measurement offset estimate of the $i^{th}$ channel at time index n;

$\delta_{mini}[n]$: the minimum measurement offset estimate with respect to the local oscillator of the $i^{th}$ channel at time index n;

In_Valid$_i$[n]: the input validity flag of the $i^{th}$ channel at time index n; and Out_Valid$_i$[n]: the output validity flag of the $i^{th}$ channel at time index n.

These five data elements are maintained in the MOF input buffer. Each buffer entry is indexed by the time epoch index (n). A circular buffer implementation is a preferred means to efficiently operate on the last N samples. The initialization condition is In_Valid [j] and Out Valid[j] is FALSE for all entries in the buffer.

The channel measurement property data for the MOF algorithm of step 340 is defined as follows:

$b_i$: the input offset buffer sizing factor. Buffer depth is $2^{bi}$ (=N) elements;

res$_i$: the native timestamp resolution of the measurement (nanoseconds per lsb);

bufmin$_i$: the minimum number of valid buffer entries required to process a valid output;

tilt$_i$: the estimated tilt (in a native measurement resolution units) between successive offset samples; and slew$_{mof}$: the slew limiting factor to constrain outlier induced deviation from the floor 0<slew$_{mof}$<1.

Using the variables defined above, the MOF algorithm of step 340 is as follows:

Step 1: Add the current (index n) sample to the MOF buffer and remove the oldest index sample.

Step 2: Verify that at least bufmin$_i$ of the inputs are valid. If not, set current Out_Validi[n] to false and exit.

Step 3: Update the un-tilted buffer entries.

Step 3a: Calculate the new tilt factor:

tilt$_i$=NCO$_{syst}\tau_0$/res$_i$, where NCO$_{syst}$ is the overall system fractional frequency correction currently applied to the local oscillator (fractional units of ppb) and $\tau_0$ is the spacing between offset samples (seconds);

Step 3b: Initialize cumulative tilt (ctilt) to zero;

Step 3c: Operate on the circular store as follows. The current sample is n modulo N and the oldest sample is (n−N+1) modulo N. Set index j=(n−N+1) modulo N;

Step 3d: $\delta_{utmi}[j]=\delta_{mi}[j]$+ctilt;

Step 3e: ctilt=ctilt+tilt$_i$;

Step 3f: If j=n modulo N then exit step 3;

Step 3g: j=(j+1) modulo N go to step 3d.

Step 4: Update the current minimum measurement offset value at time n.

Step 4a: Search through the set of un-tilted entries (with in_valid set TRUE) and determine the index j$_{floor}$ of the minimum entry. In cases of ties, the newer entries have priority;

Step 4b: If $\delta_{mi}[j_{floor}]<\delta_{mini}[(n-1)\text{modulo } N]$ then $\delta_{mini}[(n)\text{modulo } N]=\delta_{mi}[j_{floor}]$;

Step 4c: Else $\delta_{mini}[(n)\text{modulo } N]=\delta_{mini}[(n-1)\text{modulo } N](1-\text{slew}_{mof})+\delta_{mi}[j_{floor}]\text{slew}_{mof}$.

From step 340, minimum offset data 345 is provided to step 350, where a frequency estimate filter (FEF) performs a linear filtering process and generates the rate of change of phase delay (fractional frequency error) of a particular input channel with respect to the local oscillator. The output 375 of the FEF algorithm is a frequency estimate and an associated validity flag for the current channel. Persons skilled in the art will recognize that alternate linear filter structures can be utilized as well, without departing from the basic scope of the present invention. The FEF algorithm presented in this embodiment constitutes a computationally efficient operation.

The FEF algorithm of step 350 utilizes data associated with each channel at time epoch n and FEF data. The following data is associated with each channel at time epoch n:

$\delta_{smini}[n]$: the minimum smoothed measurement offset estimate with respect to the local oscillator of the $i^{th}$ channel at time index n;

f$_{smini}$[n]: the minimum smoothed frequency estimate with respect to the local oscillator of the i channel at time index n;

f$_{esti}$[n]: the output frequency estimate with respect to the local oscillator of the $i^{th}$ channel at time index n;

In_FEF_Valid$_i$[n]: the input validity flag of the $i^{th}$ channel at time index n; and Out_FEF_Valid$_i$[n]: the output validity flag of the $i^{th}$ channel at time index n.

The five data elements defined are maintained if the FEF buffer. Each buffer entry is indexed by the time epoch index (n). A circular buffer implementation is a preferred means to efficiently operate on the last N samples. The initialization condition is In_FEF_Valid[j] and Out_FEF_Valid[j] is FALSE for all entries in the buffer.

The FEF data for the FEF algorithm of step 350 is defined as follows:

$b_i$: the FEF buffer sizing factor. Buffer depth is $2^{bi}$ (M) elements;

$\tau_{sf}$: the first stage frequency filtering smoothing time constant; and r$_{est}$: the ratio parameter to control the time constant of the secondary stage frequency-smoothing filter.

Using the variables defined above, the FEF algorithm of step 350 is as follows:

Step 1: Add the current (index n) sample to the FEF buffer and remove the oldest index sample.

Step 2: If the input data is valid update the osmini[n] parameter as:

$$\delta_{smini}[n]=[\delta_{smini}[n-1]((\tau_{sf}/\tau_0)-1)+\delta_{mini}[n]]/(\tau_{sf}/\tau_0).$$

Step 3: Convert to a smoothed frequency estimate.

Step 3a: If the both the newest and oldest In_FEF_Valid$_i$[n] entries are valid, convert to a frequency to a frequency estimate:

$$f_{smini}[n]=[\delta_{smini}[n]-\delta_{smini}[n-M]]/(M\tau_0),$$

set current entry Out_FEF_Valid$_i$[n]: to TRUE;
Step 3b: Else set current entry Out_FEF_Valid$_i$[n]: to FALSE.
Step 4: If the Out_FEF_Valid is TRUE update the $f_{esti}$[n] parameter as:

$$f_{esti}[n]=[f_{esti}[n-1]((r_{est}\tau_s/\tau_0)-1)+f_{smini}[n]]/(r_{est}\tau_s/\tau_0).$$

Figure 3C:
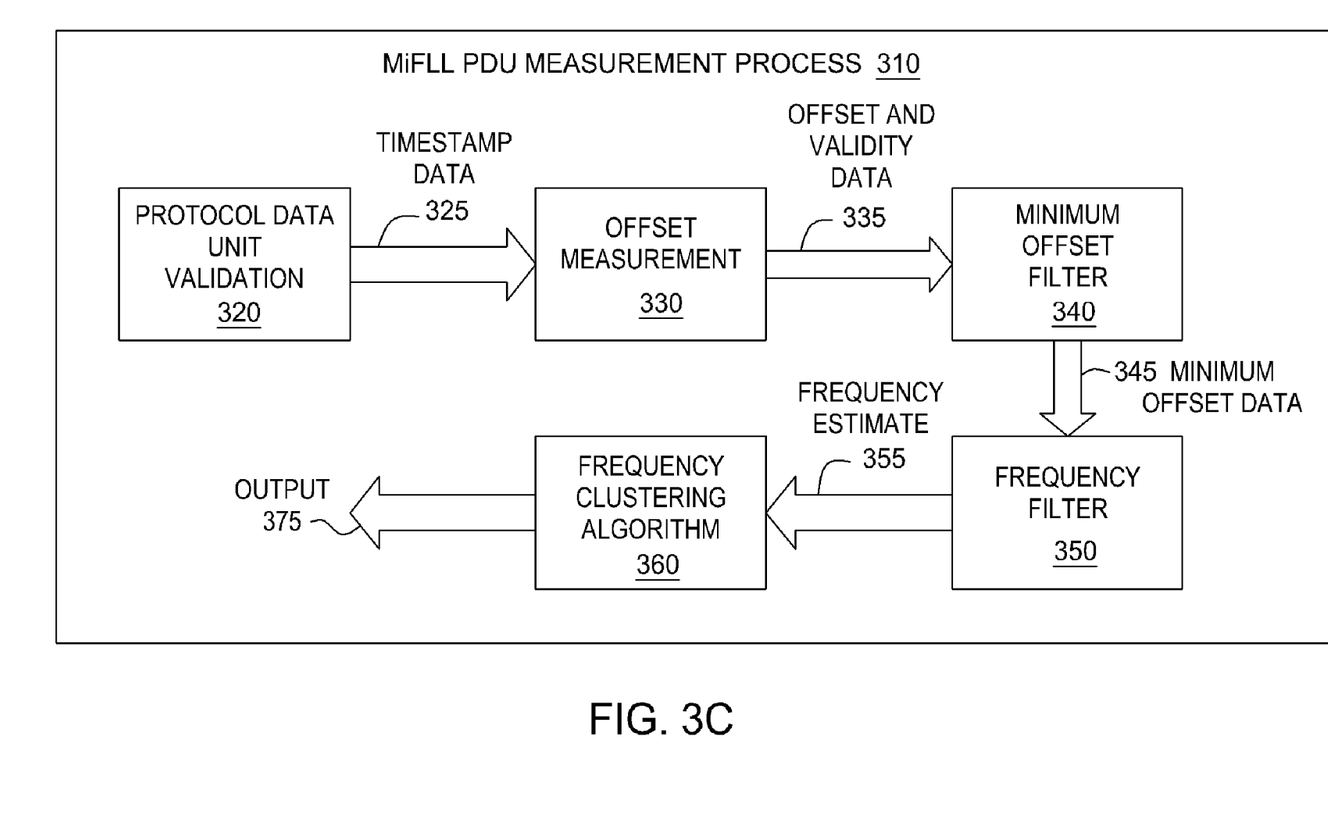
FIG. 3C illustrates the steps of the MiFLL PDU measurement process, according to another embodiment of the present invention.

FIG. 3C illustrates the steps of the MiFLL PDU measurement process 310, according to another embodiment of the present invention. In this embodiment, steps 320, 330, 340, and 350 are as described in FIG. 3B with an additional step 360. From step 350, a frequency estimate 355 is provided to step 360, where the frequency clustering (FC) algorithm detects and removes frequency estimation outliers that are inconsistent with the previous channel behavior before these outliers can negatively impact the client output frequency. The expectation is that the frequency estimates associated with individual server clocks and associated paths should be similar at a given time epoch n. The similarity in the estimate is based on the following three assumptions. First assumption is that the local oscillator frequency offset is common to all measurements at a given time epoch. Second assumption is that PDV will introduce bounded errors in the frequency estimation process. Finally, the normal operation of source clocks is to operate with essentially insignificant bias as compared to path effects. In practice, PDV will generate the most significant distance between the elements in the frequency cluster. Therefore, the FC algorithm serves to accommodate the difference in steady state PDV between the channels. In addition, the FC algorithm accommodates gradual changes in the underlying stability of a frequency estimate. Thus, real-world effects, such as loading or path changes, are anticipated. In other words, the FC algorithm, detecting and removing frequency outliers, may be viewed as a firewall which eliminates detectable outliers. Noise effects within this firewall cannot be eliminated, but the weighted ensembling in the MiFLL section of the algorithm is designed to minimize the effect.

The FC algorithm of step 360 utilizes data associated with each channel at time epoch n, defined as follows:
$f_i$[n]: the frequency error estimate with respect to the local oscillator of the $i^{th}$ channel at time index n;
$\sigma^2_i$[n]: the Allan Variance estimate with respect to the local oscillator of the $i^{th}$ channel at time index n;
In_Valid$_i$[n]: the input validity flag of the $i^{th}$ channel at time index n;
Cluster_Valid$_i$[n]: the cluster validity flag of the $i^{th}$ channel at time index n; and
$\alpha_{ci}$[n]: smoothing factor for the $i^{th}$ channel cluster Allan variance filter at time index n. ($0<\alpha_{min}<\alpha_c<\alpha_{max}<1$).

Using the variables defined above, the FC algorithm of step 360 is as follows:
Step 1: Initialize all Cluster_Valid flags to TRUE.
Step 2: Calculate m, where m is the number of elements with both In_Valid and Cluster_Valid asserted.
Step 3: Calculate the centroid of the candidate cluster:
Step 3a: For each valid channel in the set of m calculate the weight as $w_i[n]=w_{ri}[n]/\Sigma\ w_{ri}[n]$ sum overall m valid channels, where $w_{ri}[n]=1/\sigma^2_i[n-1]$ and $\sigma^2_i$[n] calculation discussed latter;
Step 3b: Use weights in 3a to calculated cluster weighted average as $f_{cavg}[n]=\Sigma\ f_i[n]\ w_i[n]$ sum overall m valid channels.
Step 4: For each valid channel:
Step 4a: Calculate cluster outlier threshold as $T_{ci}[n]=p\ \sigma^2_i[n-1][1+1/m]$, where p is fixed percentile factor normally [1<p<3];
Step 4b: If the distance exceeds threshold $|f_i[n]-f_{cavg}[n]|>T_{ci}[n]$ then set Cluster_Valid$_i$[n] to FALSE.
Step 5: Recalculate m. If no change then clustering is complete else go to Step 3.

Calculating an Allan Variance estimate is necessary to supporting the FC algorithm. The Allan Variance is a metric for estimating frequency stability of real-world random frequency processes. As described herein, the frequency estimation samples $f_i$[n] are with respect to the local free-running oscillator. The MiFLL algorithms are based on allowing the local oscillator to operate in the free-run state. There is no necessity to varactor-steer the oscillator which will, in turn, introduce noise and non-linear effects. When varactor steering is employed the MiFLL algorithm is readily extended by utilizing an estimate of the steering correction to effectively obtain free-running data. The final output of the system is usually accomplished with digital frequency synthesis to compensate for the open loop (free-running) error in the local oscillator. In principle, the variance estimate would be biased by the oscillator noise over the integration time used for frequency estimation. For all practical cases, this excess oscillator noise is very small compared to the channel noise, and the local oscillator can be used as reference for the short term input noise calculation.

The Allan Variance estimates are only updated after the clustering algorithm is completed at time n. Only the valid set of m channels is updated. An Allan Variance sample is constructed for a channel as follows:
$S_i[n]=(f_i[n]-f_i[n-1])/2$, and the Allan Variance is updated as:
$\sigma^2_i[n]=(1-\alpha_{ci}[n])\sigma^2_i[n-1]+\alpha_{ci}[n]S^2_i[n]$.
As previously described herein, $\alpha_{ci}$[n] is the smoothing factor for the $i^{th}$ channel cluster Allan variance filter at time index n. The smoothing factor balances the responsiveness of the estimator to gradually changes in the noise level with the confidence interval of the estimator. The behavior is constrained by a global maximum and minimum value ($0<\alpha_{ci}[n]<\alpha_c<\alpha_{max}<1$). To support initially convergence $\alpha_{ci}$ is set to $\alpha_{max}$ and gradually reduced to $\alpha_{min}$ as follows:

$\alpha_{ci}[n]=(1\alpha_x)\alpha_{ci}[n-1]+a_c\alpha_{ci}[n]$, where $a_c$ is the global adaptation factor for the system.

At a channel re-initialization both $\alpha_{ci}$ is set to $\alpha_{max}$ and $\sigma^2_i$[n] is set to a global maximum level $\sigma^2_{cmax}$. All channels need to be initialized at the system startup. Also, after a persistent period of invalid condition (either input or cluster), the channel should be re-initialized.

Figure 4:
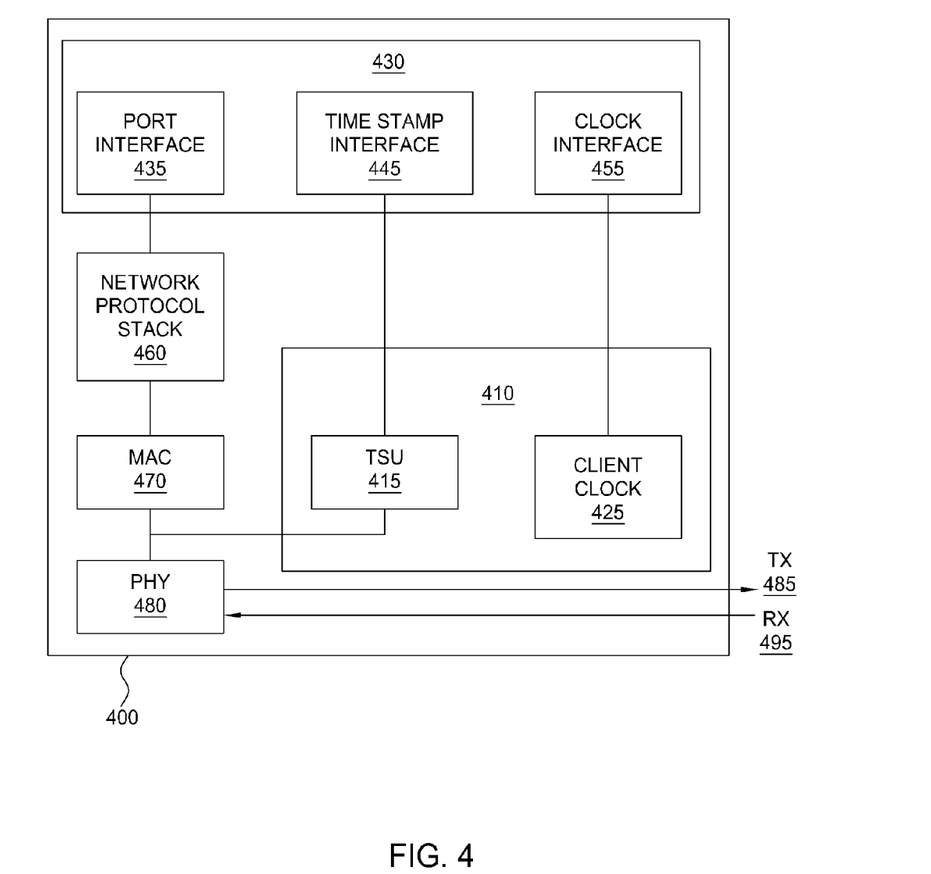
FIG. 4 is a conceptual diagram of a synchronization element configured to implement one or more aspects of the present invention.

FIG. 4 is a conceptual diagram of a synchronization element 400 configured to implement one or more aspects of the present invention. As shown, the synchronization element 400 includes, without limitation, a clock unit 410, a frequency estimate generating unit 430, a network protocol stack 460, a media access controller (MAC) 470, and a physical layer (PHY) 480. The synchronization element 400 transmits packets over the transmitting output (TX) 485 and receives packets over the receiving input (RX) 495. The clock unit 410 includes, without limitation, a time stamp unit (TSU) 415 to generate the time stamps and a client clock 425. The frequency estimate generating unit 430 includes, without limitation, a port interface 435, a time stamp interface 445, and a clock interface 455. The frequency estimate generating unit 430 implements the algorithms described herein with the binding to the client clock 425 and the hardware TSU 415. The port interface 435 is used to dispatch and/or receive multicast NTP and PTP messages. The time stamp interface 445 is used to dispatch and/or receive time stamps. In certain instantiations the timestamp interface 445 and port interface 435 may be integrated into a single combined interface. The clock interface 455 is used to read and modify the local clock 425 in accordance with the result generated in the frequency estimate generating unit 430. The synchronization element 400 can be implemented in any processor that contains a time stamping unit and a local clock.

Figure 5:
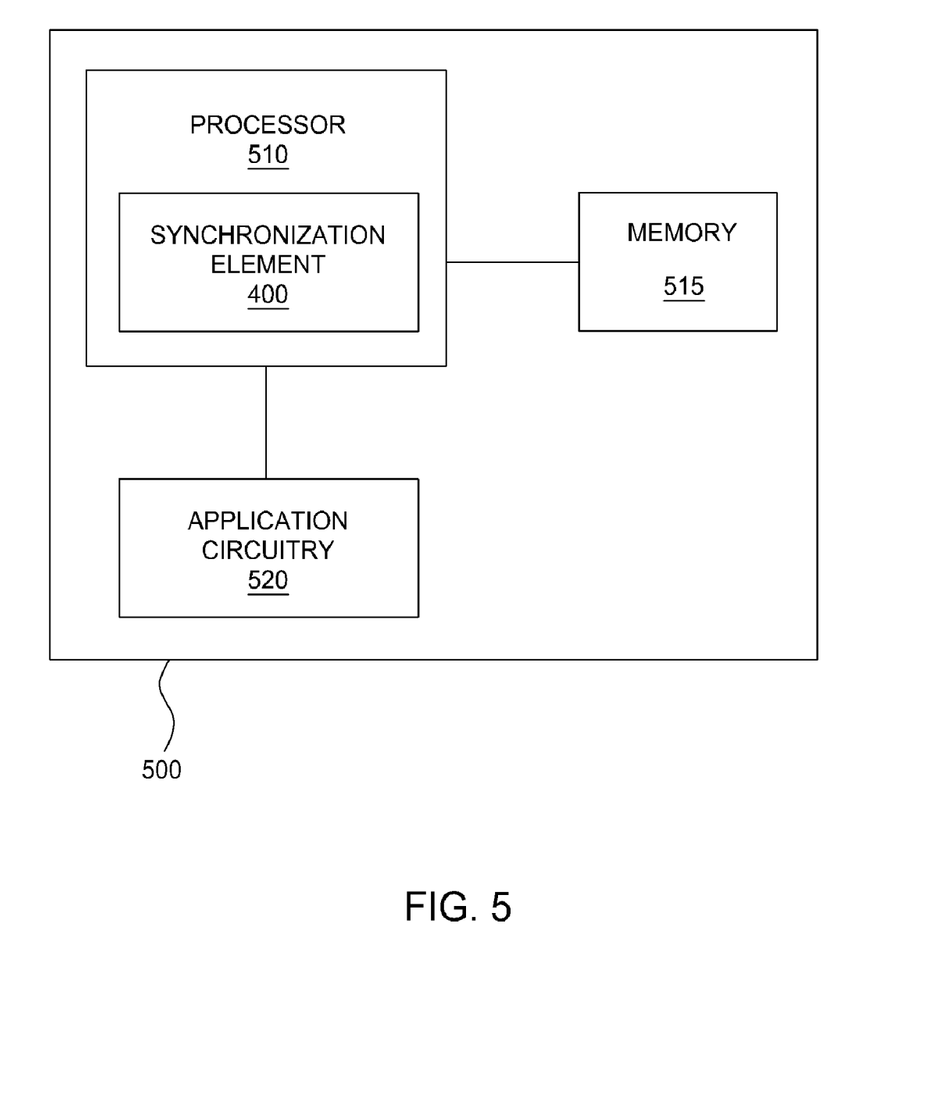
FIG. 5 illustrates a computing device configured to implement one or more aspects of the present invention.

FIG. 5 illustrates a computing device 500 configured to implement one or more aspects of the present invention. As shown, the computing device 500 includes a processor 510, a memory 515, and an application circuitry 520. The memory 515 and the application circuitry 520 are coupled to the processor 510. The processor 510, in turn, includes the synchronization element 400. The synchronization element 400 executes the algorithms described in the present invention and enables the client clock 425 within the computing device 500 to be synchronized with the most precise server clocks on the network. The computing device 500 may be any type of computing device that includes application circuitry requiring a client clock to produce a timing signal. Some examples of computing device include, without limitation, a personal computer, a data center server, a router, an IP telephony device, a cellular phone, and a personal digital assistant. The more likely instantiation is in embedded computing devices with built-in timestamp and clock support. These computing devices find general application is telecommunication and industrial applications required client synchronization including DSL aggregators, passive optical networks ONUs and wireless base stations and access points.

The present invention enables a computing device to
Receive time and frequency information from a variety of timing sources;
Cross-check the data received from a variety of timing sources, generate a suitable frequency difference between the client clock and each of the timing sources, and autonomously establish validity of each timing source by performing the steps of
PDU validation;
Offset measurement;
Minimum offset filtering;
Frequency filtering;
Frequency clustering;
Provide the most reliable primary and secondary tier inputs to the MiFLL;
Achieve a client clock with good stability for any specified time measurement interval.

One advantage of the disclosed methods is that control of the client clock may be achieved by using less trustworthy timing sources such as multicast NTP and multicast PTP servers to supplement the primary tier sources. The disclosed methods include the algorithms for cross-checking the measurement data obtained from the multicast NTP and multicast PTP servers, autonomously establishing validity of the channel, and concluding whether the current frequency estimate from a channel may be used in the MiFLL algorithm. As a result, time and frequency information at the client clocks can be generated with lower cost, lower power oscillators without adding the burden to the primary tier sources, thereby reducing costs for both the servers and the clients. Furthermore, the disclosed methods classify the various timing sources available in terms of "validity" and "suitability" and weigh them appropriately for use in the overall solution. Such a classification improves the outcome of the MiFLL algorithm because only the most reliable primary and secondary tier inputs are supplied to the MiFLL. In addition, the disclosed methods enable client clocks with good stability for the short term, intermediary, and long term measurement intervals that are easily reproducible throughout an entire network.

The present invention can be implemented in hardware or software, with the software being delivered as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention.

While the foregoing is directed to embodiments of the present invention, other and further embodiments of the invention may be devised without departing from the basic scope thereof.

I claim:

1. A method for generating frequency estimates between a client clock and multiple server clocks and supplying them to a multiple input frequency locked loop (MiFLL), the method being carried out in a computing device and comprising:
receiving at least two protocol data units (PDUs) from each of at least two server clocks, wherein each PDU includes a plurality of time stamps;
extracting the plurality of time stamps from each PDU;
generating multiple frequency estimates that include a frequency estimate between the client clock and each of said at least two server clocks, wherein a frequency estimate between the client clock and each of said at least two server clocks is generated by:
(i) computing a time offset between the client clock and the server clock for each PDU received from the server clock;
(ii) selecting a subset of the computed time offsets; and
(iii) generating the frequency estimate using the selected time offsets; and
providing the frequency estimates to the MiFLL.

2. The method according to claim 1, wherein the plurality of time stamps comprise at least two of the group consisting of a time stamp $T_1$ comprising an estimate of the transmit origination epoch of the PDU originating from the client clock, a time stamp $T_2$ comprising an estimate of the receive termination epoch of the PDU terminating at the server clock connected over a network to the client, a time stamp $T_3$ comprising an estimate of the transmit origination epoch of the PDU originating from the server clock, and a time stamp $T_4$ comprising an estimate of the receive termination epoch of the PDU terminating at the client clock, wherein epoch means a time interval.

3. The method according to claim 1, wherein the frequency estimate is output with a validity flag.

4. The method according to claim 1, further comprising: applying frequency clustering (FC) to the frequency estimates to remove frequency estimate outliers that are inconsistent with previous channel behavior during a given time epoch, wherein each of the server clocks is a separate channel.

5. The method according to claim 4, further comprising: calculating and updating an Allan Variance estimate, wherein the Allan Variance estimate is updated for a set of channels extending to the client clock determined to be valid after the frequency clustering is completed at the end of the time epoch.

6. A computing device for generating frequency estimates between a client clock and multiple server clocks and supplying them to a multiple input frequency locked loop (MiFLL), the computing device comprising:
  memory; and
  processor coupled to the memory, that has a synchronization element, wherein the synchronization element includes:
    a clock unit, and
    a frequency estimate generating unit configured to generate multiple frequency estimates that include a frequency estimate between the client clock and each of at least two server clocks and provide the frequency estimates to the MiFLL,
    wherein the frequency estimate generating unit is configured to generate the frequency estimate between the client clock and each of at least two server clocks by:
      (i) receiving at least two protocol data units (PDUs) from the server clock, wherein each PDU includes a plurality of time stamps;
      (ii) extracting the plurality of time stamps from each PDU;
      (iii) computing a time offset between the client clock and the server clock for each PDU received from the server clock;
      (iv) selecting a subset of computed time offsets; and
      (v) generating the frequency estimate using the selected time offsets.

7. The computing device according to claim 6, wherein the plurality of time stamps comprise at least two of the group consisting of a time stamp $T_1$ comprising an estimate of the transmit origination epoch of the PDU originating from the client clock, a time stamp $T_2$ comprising an estimate of the receive termination epoch of the PDU terminating at the server clock connected over a network to the client, a time stamp $T_3$ comprising an estimate of the transmit origination epoch of the PDU originating from the server clock, and a time stamp $T_4$ comprising an estimate of the receive termination epoch of the PDU terminating at the client clock, wherein epoch means a time interval.

8. The computing device according to claim 6, wherein the frequency estimate generating unit is configured to output the frequency estimate with a validity flag.

9. The computing device according to claim 6, wherein the frequency estimate generating unit is further configured to apply frequency clustering (FC) to the frequency estimates to remove frequency estimate outliers that are inconsistent with previous channel behavior during a given time epoch, wherein each of the server clocks is a separate channel.

10. The computing device according to claim 6, wherein one of the server clocks is installed in a multicast NTP server, capable of providing packet-based timing information with an N to M association between a server and a client, where N and M may be any integer greater or equal to one.

11. The computing device according to claim 6, wherein one of the server clocks is installed in a multicast PTP server, capable of providing packet-based timing information with an N to M association between a server and a client, where N and M may be any integer greater or equal to one.

12. A non-transitory computer-readable storage medium encoded with a computer program for controlling a computer system to generate frequency estimates between a client clock and multiple server clocks and supply them to a multiple input frequency locked loop (MiFLL), by a method comprising:
  receiving at least two protocol data units (PDUs) from each of at least two server clocks, wherein each PDU includes a plurality of time stamps;
  extracting the plurality of time stamps from each PDU;
  generating multiple frequency estimates that include a frequency estimate between the client clock and each of said at least two server clocks, wherein a frequency estimate between the client clock and each of said at least two server clocks is generated by:
    (i) computing a time offset between the client clock and the server clock for each PDU received from the server clock;
    (ii) storing the computed time offsets;
    (iii) selecting a subset of the computed time offsets;
    (iv) storing the selected time offsets; and
    (v) generating the frequency estimate using the selected time offsets; and
  providing the frequency estimates to the MiFLL.

13. The non-transitory computer-readable storage medium according to claim 12, wherein the plurality of time stamps comprise at least two of the group consisting of a time stamp $T_1$ comprising an estimate of the transmit origination epoch of the PDU originating from the client clock, a time stamp $T_2$ comprising an estimate of the receive termination epoch of the PDU terminating at the server clock connected over a network to the client, a time stamp $T_3$ comprising an estimate of the transmit origination epoch of the PDU originating from the server clock, and a time stamp $T_4$ comprising an estimate of the receive termination epoch of the PDU terminating at the client clock, wherein epoch means a time interval.

14. The non-transitory computer-readable storage medium according to claim 12, wherein the frequency estimate is displayed with a validity flag.

15. The non-transitory computer-readable medium according to claim 12, wherein the method further comprises the step of applying a frequency clustering (FC) to the frequency estimates to remove frequency estimate outliers that are inconsistent with previous channel behavior during a given time epoch, wherein each of the server clocks is a separate channel.

16. The non-transitory computer-readable medium according to claim 12, wherein one of the server clocks is installed in a multicast NTP server, capable of providing packet-based timing information with an N to M association between a server and a client, where N and M may be any integer greater or equal to one.

17. The non-transitory computer-readable medium according to claim 12, wherein one of the server clocks is installed in a multicast PTP server, capable of providing packet-based timing information with an N to M association between a server and a client, where N and M may be any integer greater or equal to one.

* * * * *